United States Patent [19]
Fields

[11] Patent Number: 5,317,364
[45] Date of Patent: May 31, 1994

[54] METHOD AND APPARATUS FOR REPRODUCING AN IMAGE RECORDED ON A PHOTOGRAPHIC FILMSTRIP

[75] Inventor: Roger A. Fields, Pittsford, N.Y.

[73] Assignee: Eastman Kodak Company, Rochester, N.Y.

[21] Appl. No.: 34

[22] Filed: Jan. 4, 1993

[51] Int. Cl.$^5$ ............................................. G03B 27/52
[52] U.S. Cl. .................................................... 355/40
[58] Field of Search ....................... 355/40, 41, 42, 72

[56] References Cited

U.S. PATENT DOCUMENTS

| | | | |
|---|---|---|---|
| 4,627,719 | 12/1986 | Nitsch et al. | 355/41 |
| 4,806,990 | 1/1989 | Tahara | 355/77 |
| 4,834,306 | 5/1989 | Robertson et al. | 242/71.1 |
| 4,933,780 | 6/1990 | Wash et al. | 360/1 |
| 4,965,626 | 10/1990 | Robison et al. | 355/40 |
| 5,029,313 | 7/1991 | Robison et al. | 355/40 |
| 5,093,686 | 3/1992 | Shigaki | 355/77 |
| 5,157,437 | 10/1992 | Takenaka | 355/41 |

*Primary Examiner*—Michael L. Gellner
*Assistant Examiner*—D. P. Malley
*Attorney, Agent, or Firm*—David A. Howley

[57] ABSTRACT

An apparatus for reproducing images recorded on a photographic filmstrip wound on a film spool contained in a cartridge, the photographic filmstrip having machine-readable frame numbers associated with the images recorded thereon and the photographic filmstrip being associated with a device for storing film related data including frame numbers identifying selected images to be reproduced. The apparatus characterized in that a control device includes determining whether a frame number of a first available frame on a photographic filmstrip removed from a film cartridge is equal to one or is greater than one; searching first for a highest of the respective frame numbers of the selected images on a photographic filmstrip removed from the cartridge and then in succession the next lowest frame number of the selected images until all of the frame numbers of the selected images have been found if the frame number of the first available frame of a photographic filmstrip is equal to one, or for searching first for a lowest of the respective frame numbers of the selected images on a photographic film strip removed from the cartridge and then in succession the next highest frame number of the selected images until all of the frame numbers of the selected images have been found if the frame number of the first available frame of a photographic filmstrip is greater than one, and printing each one of the selected images in response to its frame number being found.

9 Claims, 6 Drawing Sheets 5,317,364

METHOD AND APPARATUS FOR REPRODUCING AN IMAGE RECORDED ON A PHOTOGRAPHIC FILMSTRIP

FIELD OF INVENTION

The present invention is generally directed to the field of photography and in particular to a method and apparatus for reproducing an image recorded on a photographic filmstrip.

BACKGROUND OF THE INVENTION

Very often only selected images on a photographic filmstrip are to be reproduced by a photofinishing laboratory. This generally occurs when photographic prints need to be made over due to under- or overexposure during the printing process or when a customer requests reprints of selected images.

A method to reproduce selected images from the filmstrip generally includes such steps as the photofinishing lab or dealer recording the frame numbers of the images to be reproduced and printing the selected images.

Conventionally, a roll of photographic film is cut into short lengths of filmstrips containing, for example, four frames after the roll of film has been developed and printed. In a wholesale photofinishing laboratory when reprints or make overs are requested, the short lengths of filmstrips would be spliced together to form a reel of various filmstrips having images to be reproduced. The reel of filmstrips is sent to a printer where the frame numbers from the filmstrips can be read and the selected images associated with the recorded frame numbers are reproduced onto photographic paper.

U.S. Pat. No. 5,093,686 issued Mar. 3, 1992 discloses an alternative method for reproducing images recorded on a photographic film which eliminates the need to splice together short lengths of photographic filmstrips during a printing process. The photographic film can be subjected to the printing process with one end fixed to a spool of a film cassette.

PROBLEM TO BE SOLVED BY THE INVENTION

There is, therefore, a need to develop a method and apparatus to reproduce selected images from a photographic film which takes advantage of the ability to subject a photographic film to a printing process while one end of the film is fixed to a spool of a film cassette.

SUMMARY OF THE INVENTION

The present invention is directed to an apparatus for reproducing images recorded on a photographic filmstrip wound on a film spool contained in a cartridge, said photographic filmstrip having machine-readable frame numbers associated with said images recorded thereon and said photographic filmstrip being associated with means for storing film related data including frame numbers identifying selected images to be reproduced. Said apparatus comprises first means for reading said stored data, second means for reading said frame numbers, means for printing said images onto a photographic paper and means for controlling said first and second reading means, and said printing means; said apparatus characterized in that said control means includes means for determining whether a frame number, read by said second reading means, of a first available frame on a photographic filmstrip removed from a film cartridge is equal to one or is greater than one; means for searching first for a highest of the respective frame numbers of the selected images, read by said first reading means, on a photographic filmstrip removed from the cartridge and then in succession the next lowest frame number of the selected images until all of the frame numbers of the selected images have been found if the frame number of the first available frame of a photographic filmstrip is equal to one, or for searching first for a lowest of the respective frame numbers of the selected images, read by said first reading means, on a photographic film strip removed from the cartridge and then in succession the next highest frame number of the selected images until all of the frame numbers of the selected images have been found if the frame number of the first available frame of a photographic filmstrip is greater than one, and means for activating said printing means to print each one of the selected images in response to its frame number being found.

The present invention is also directed to a method for reproducing selected images recorded on a photographic filmstrip contained in a film cartridge, said photographic filmstrip being associated with means for storing film related data including frame numbers identifying selected images to be reproduced; comprising the steps of reading the frame numbers identifying the selected images to be reproduced; and transporting the photographic filmstrip in a first direction towards a printing station; characterized by determining whether the frame number of a first available frame of a photographic filmstrip is equal to one or is greater than one; if the frame number is determined to be equal to one, searching first for a highest of the respective frame numbers of the selected images on a photographic filmstrip removed from a film cartridge and then in succession the next lowest frame number of the selected images until all of the frame numbers of the selected images have been found; if the frame number is determined to be greater than one, searching for a lowest of the respective frame numbers of the selected images on a photographic filmstrip removed from a film cartridge and then in succession the next, highest frame number of the selected images until all of the frame numbers of the selected images have been found; and printing each one of the selected images in response to its frame number being found.

The image reproducing apparatus and method for reproducing selected images from a photographic filmstrip allow the printing of images onto photographic paper while one end of the photographic filmstrip remains fixed to the film spool in the cartridge. Furthermore, the image reproducing apparatus will prevent the photographic filmstrip from inadvertently slipping off the film spool.

BRIEF DESCRIPTION OF THE DRAWINGS

Other advantages of the invention will become apparent from the following description taken in connection with the accompanying drawing wherein.

DETAILED DESCRIPTION OF THE INVENTION

Figure 1:
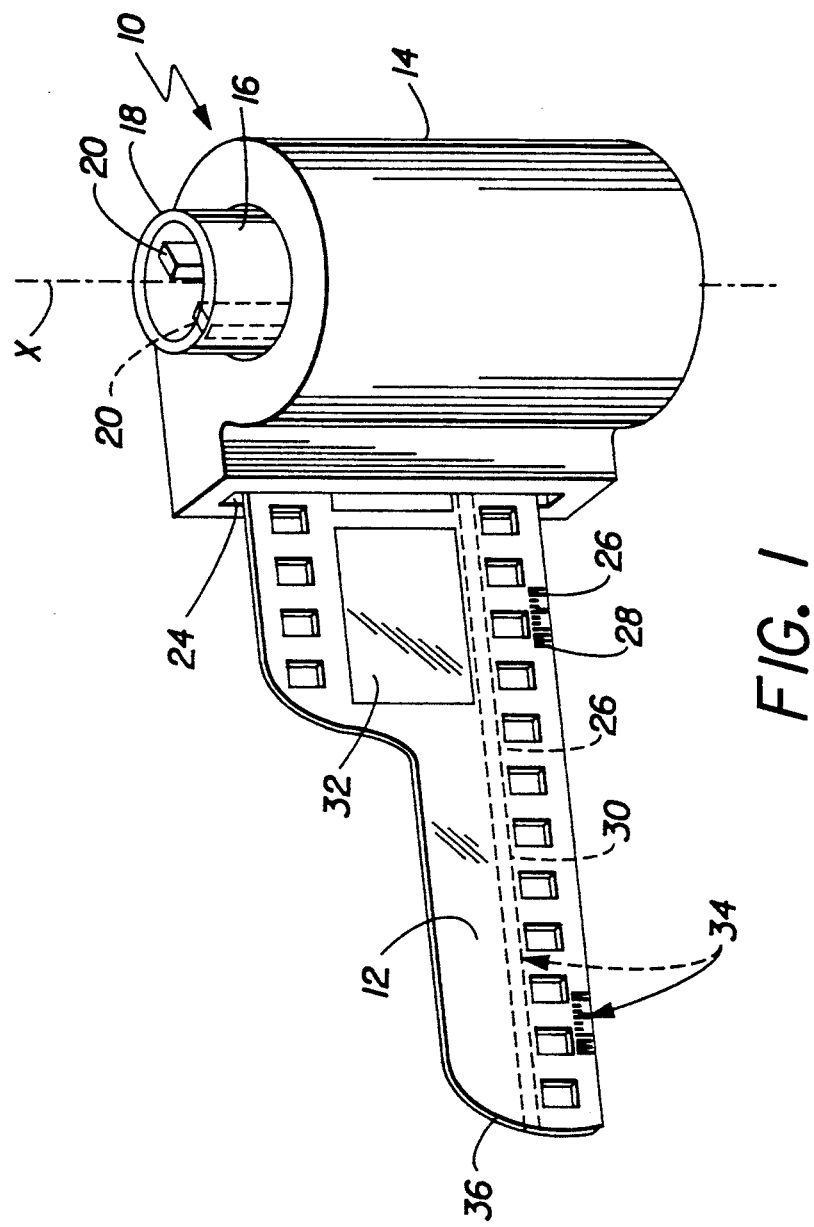
FIG. 1 is a perspective view of a film cartridge to be transported to a photofinishing process.

Referring now to the drawings, FIG. 1 depicts a film cartridge 10 containing an exposed photographic filmstrip 12. An example of such a film cartridge is disclosed in commonly assigned U.S. Pat. No. 4,834,306 issued May 30, 1989 in the name of Robertson et al., the disclosure of which is hereby incorporated by reference. The film cartridge 10 comprises a light tight cassette shell 14 and a film spool 16 rotatable about an axis X within the cassette shell 14.

A spool end 18 of the film spool 16 includes a pair of keying ribs 20. The keying ribs 20 may be engaged to rotate the film spool 16 to thrust the photographic filmstrip 12 out of the film cartridge 10 and to return the photographic filmstrip 12 to the film cartridge 10 through a film ingress/egress slot 24.

The photographic filmstrip 12 includes machine-readable frame numbers 26 associated with respective images successively recorded on the photographic filmstrip 12. The machine-readable frame numbers 26 can be optically recorded on the photographic filmstrip 12 in the form of a barcode 28 by a conventional optical read/write element or can be magnetically encoded onto a magnetic strip 30 on a virtually transparent magnetic layer (not shown) on a non-emulsion side of the photographic filmstrip 12 by a conventional magnetic read/write element (not shown) in a photographic camera (not shown). An example of such a photographic camera having a magnetic read/write element is disclosed in commonly assigned U.S. Pat. No. 4,933,780 issued Jun. 12, 1990 in the name of Wash et al., the disclosure of which is hereby incorporated by reference. An example of a photographic filmstrip having a virtually transparent magnetic layer is disclosed in commonly assigned U.S. Pat. No. 4,965,626 issued Oct. 23, 1990 in the name of Robison et al., the disclosure of which is hereby incorporated by reference.

A camera commonly referred to as a conventional wind camera will record onto the photographic filmstrip 12 a signal representing the numeral one on a first available frame 32 during a picture taking process. A camera commonly referred to as a prewind camera will encode a number greater than one on the first available frame 32 on the photographic filmstrip 12 during the picture taking process. For example, the prewind camera would record a signal representing the numeral thirty-six on the first available frame 32 if the photographic filmstrip 12 has thirty-six available frames or the prewind camera would record a signal representing the numeral twenty-four on the first available frame 32 if the photographic filmstrip has twenty-four available frames, etc.

In accordance with the preferred embodiment, the photographic filmstrip 12 is associated with means 34 for storing film related data including frame numbers identifying selected images to be reproduced. The images selected to be reproduced can be selected by a photofinishing lab or a customer. The photofinishing lab would reproduce selected images from a photographic filmstrip if certain original prints were under- or overexposed. The customer would order reprints, thus selecting images to be reproduced from a roll of photographic filmstrip.

The film data storing means 34 could include recording optical or magnetic signals on a leader portion 36 of the photographic filmstrip 12 representing the frame numbers associated with selected images to be reproduced. Alternatively, the frame numbers associated with the selected images could be optically or magnetically recorded on a sticker (not shown) adhered to the outside of the light-tight cassette shell 14.

Figure 2:
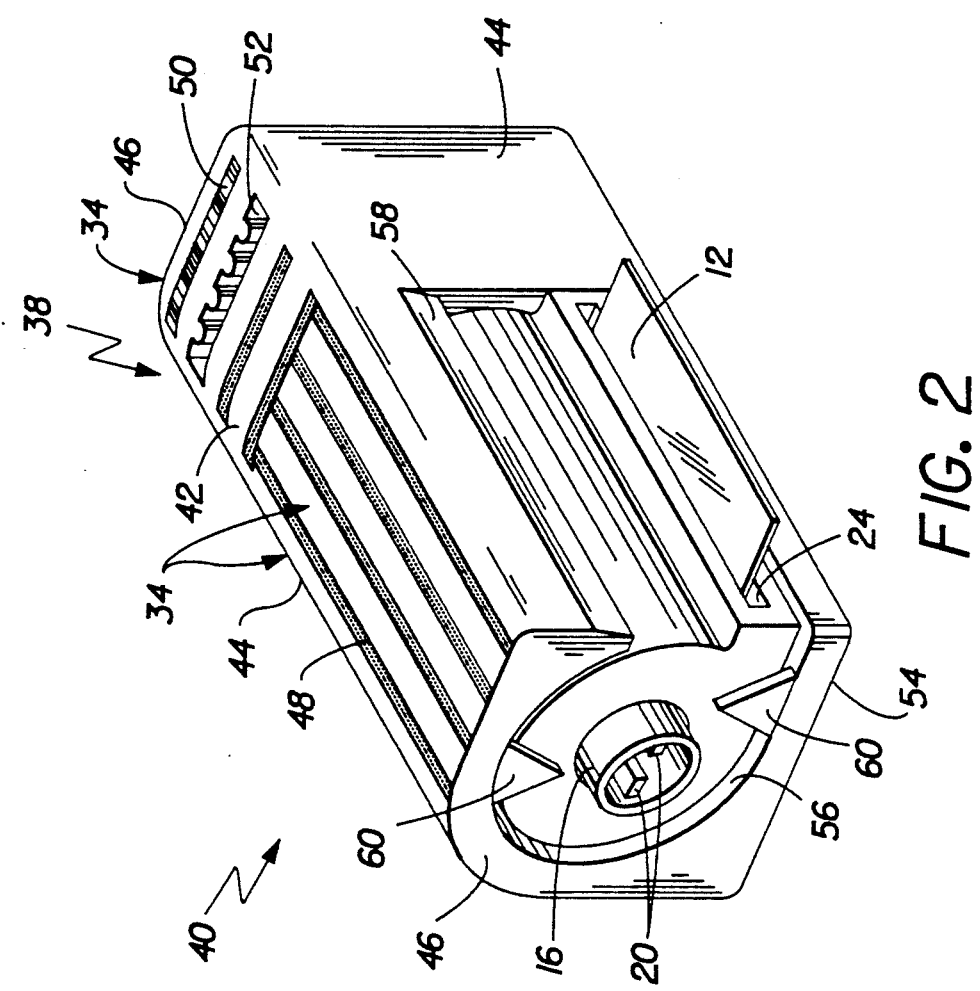
FIG. 2 is a perspective view of a transporting apparatus for transporting the film cartridge through the photofinishing process.

In accordance with a preferred embodiment, an exterior portion 38 of an apparatus 40, illustrated in FIG. 2, for transporting the film cartridge 10 containing the exposed photographic filmstrip 12 to a photofinishing process would include the film data storing means 34. The film data storing means 34 can be located on a top 42, side 44 or end 46 portion of the exterior of the transporting apparatus 40. The types of film related data to be stored can include, for example, customer name, film type, number of prints requested, dealer information, type of prints requested, etc, in addition to the frame numbers of selected images to be reproduced. Some of this film related data can be read from an incoming dealer envelope containing the film cartridge 10. The photofinishing lab can also input film related information or information relating to the photofinishing lab into the film data storing means 34.

The film data storing means 34 can include magnetic strips 48 adapted to accept magnetic encodements representing the film related data, i.e. the frame numbers of selected images to be reproduced. Recording film related data magnetically onto the magnetic strips 48 advantageously enables the photofinishing laboratory to record a relatively large amount of data in the film data storing means 34.

Alternatively, the film data storing means 34 on the exterior portion 38 can include means 50 for accepting optically recorded film related data in the form of, for example, a barcode. The film data storing means 34 can also include means 52 for accepting mechanically recorded film related data in the form of, for example, notches. See FIG. 2.

The top 42, side 44 and end 46 portions in addition to a bottom portion 54 of the transporting apparatus 40 define interior means 56 for holding a single film cartridge 10 in a fixed relation to the transporting apparatus 40. One of the side portions 44 of the transporting apparatus 40 is open to permit the film ingress/egress slot 24 of the film cartridge 10 to be exposed and one of the end portions 46 is open to permit the keying ribs 20 or the spool end 18 to be engaged so that the film spool 16 can be rotated to thrust the photographic filmstrip 12 out of the film cartridge 10 and return the photographic filmstrip 12 to the film cartridge 10. The open side portion 44 includes a lip 58 to prevent rotation of the film cartridge 10. The open end portion 46 can include flexible tabs 60 to hold the film cartridge 10 within the interior means 56.

Alternate embodiments (not shown) of the transporting apparatus 40 can include means for clamping the leader portion 36 of the photographic filmstrip 12 to releasably hold the leader portion 36 outside the film cartridge 10 during the photofinishing process. Clamping the leader portion 36 of the photographic filmstrip 12 reduces the number of times the photographic filmstrip 12 is thrust out of the film cartridge 10 during the photofinishing process. An example of such a transporting apparatus having clamping means is disclosed in commonly assigned U.S. Ser. No. 957,852 filed Oct. 8, 1992 in the name of Blackman, the disclosure of which is hereby incorporated by reference.

Figure 3:
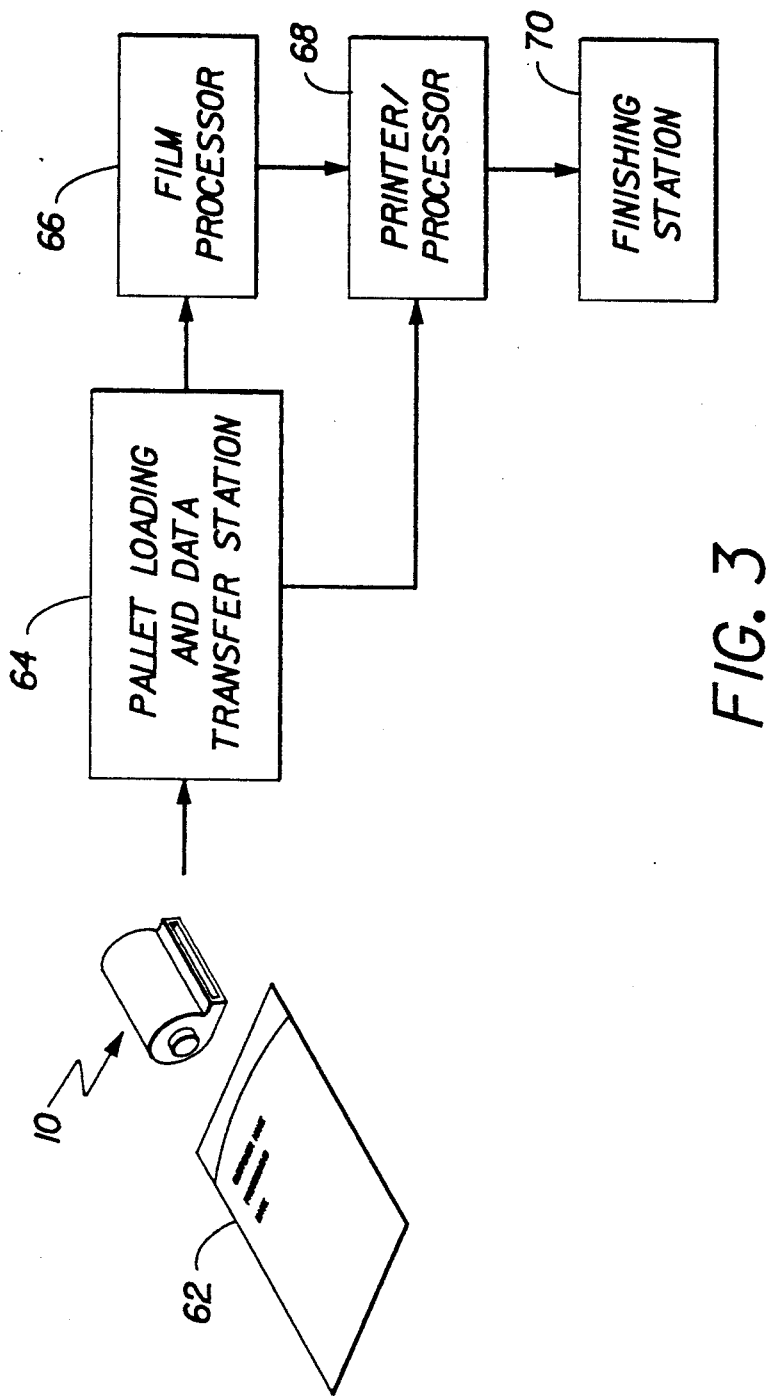
FIG. 3 is a schematic view of a photofinishing laboratory.

Referring now to FIG. 3, during the photofinishing process the film cartridge 10 which is generally received by the photofinishing lab in an envelope 62, having customer and film related information such as customer name, dealer name, number of prints, type of prints, etc. recorded thereon, is transferred to a pallet loading/data transfer station 64. The film cartridge 10 is inserted into the transporting apparatus 40 at the pallet loading/data transfer station 64 and a data reader/recorder (not shown) reads the customer and film related data from the envelope 62 and records the data, including the frame numbers associated with selected images to be reproduced, onto the film data storing means 34 on the exterior of the transporting apparatus 40. The envelope 62 can then be discarded in an appropriate manner. The photofinishing lab also can input information, including frame numbers associated with selected images to be reproduced, at this station.

It can be determined at this time if the exposed photographic filmstrip 12 in the film cartridge 10 has been previously developed. The transporting apparatus 40 will bypass a film processor 66 and be transferred to a printer/processor 68 if the film related data indicates that the photographic filmstrip 12 has been previously developed and reprints or make overs are requested. The images on the photographic filmstrip 12 will be exposed onto a photographic paper 69 and the photographic paper 69 will be processed to form the prints.

The transporting apparatus 40 is finally sent to a finishing station 70 after the photographic paper 69 is processed. The film cartridge 10 is removed from the transporting apparatus 40 and is packaged with the corresponding prints in a wallet or return envelope to return to the customer. The finishing station 70 can have a data reading/recording portion (not shown) so that it can automatically package the prints and film in accordance with the read film related data and transfer the film related data from the film data storing means 34 on the transporting apparatus 40 to the return envelope. The transporting apparatus 40 is then returned to the pallet loading/data transfer station 64 to be loaded with another film cartridge 10. Data relating to the new film cartridge will be recorded onto the film data storing means 34.

Figure 4:
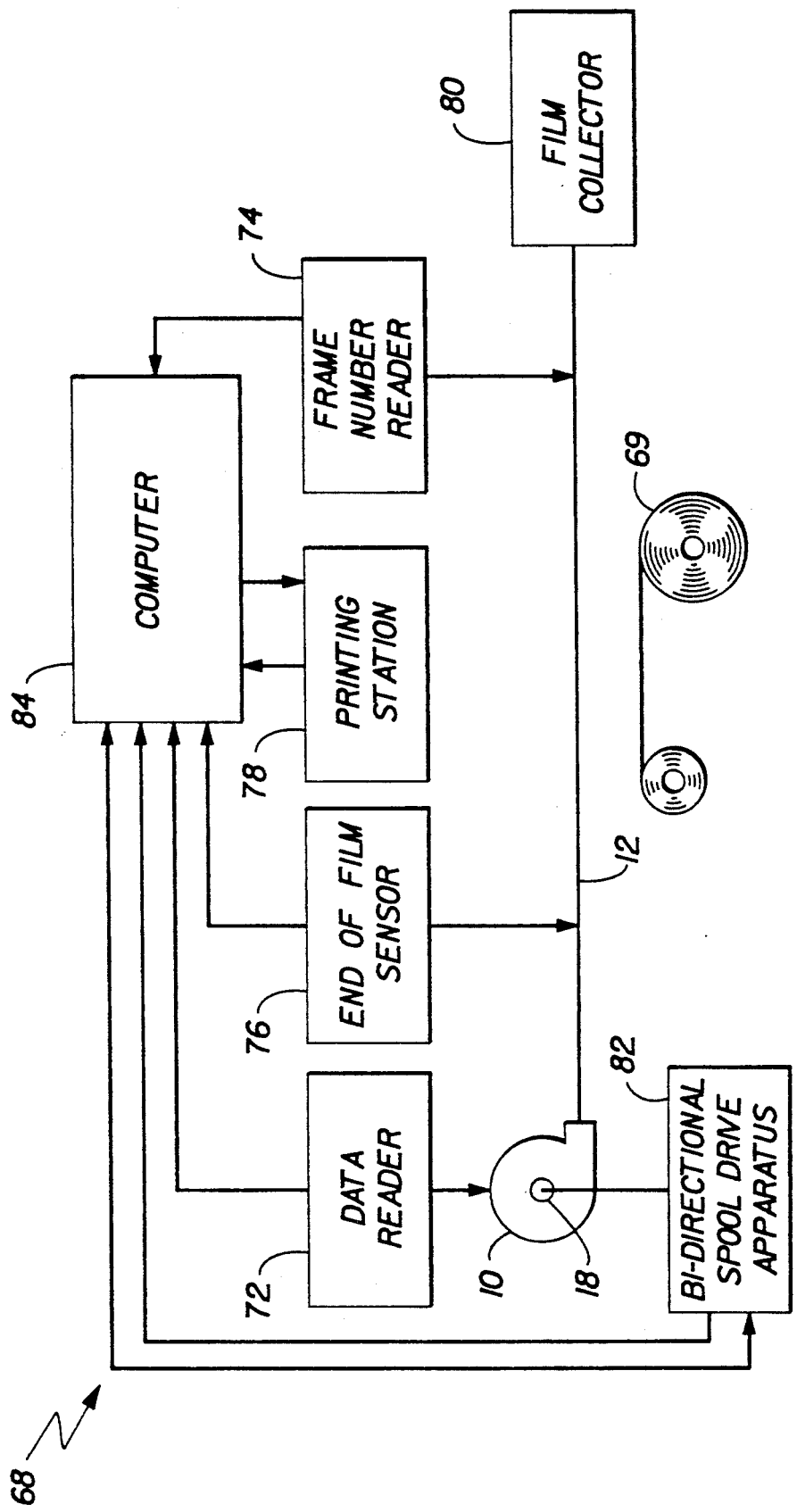
FIG. 4 is a schematic view of a photographic printer embodying the present invention.

Referring to FIG. 4, the printer/processor 68 embodying the present invention will now be described. Because photographic printer/processors and the general operations associated therewith are well known in the art, the description hereinafter will be directed in particular only to those printer/processor parts relevant to the present invention. It is to be understood, however, that printer/processor components not specifically shown or described may take various forms selectable from those known in the art.

The printer/processor 68 includes nest means (not shown) adapted to hold the transporting apparatus 40, or the film cartridge 10 if the transporting apparatus is not utilized. First means 72 for reading stored data from the film data storing means 34 is located proximate the nest means. The first reading means 72 can include a conventional optical reader and/or a conventional magnetic reading element to read the stored data including the frame numbers associated with selected images to be reproduced and an associated conventional read circuit (not shown). A second reading means 74, located downstream from the first reading means 72, is adapted to read the frame numbers associated with specific images recorded on the photographic filmstrip 12. The second reading means 74 can include a conventional optical reader and/or a conventional magnetic reading element to read the frame numbers associated with images on the photographic filmstrip 12 and an associated conventional read circuit (not shown).

A known type end of film sensor 76 is located proximate the nest means.

The printer/processor 68 further includes a printing station 78, located between the first reading means 72 and the second reading means 74, which projects images from the photographic filmstrip 12 onto the photographic paper 69. An example of such a printing station is disclosed in commonly assigned U.S. Pat. No. 5,031,773 issued Jul., 16,1991 in the name of Manico, the disclosure of which is hereby incorporated by reference. The photographic filmstrip 12 is advanced into a film collector 80 as it is unwound from the film cartridge 10.

The keying ribs 20 at the spool end 18 of the film spool 16 in the film cartridge 10 are engaged by a known type bi-directional spool drive apparatus 82 to drive the film spool 16 in a first, unwinding direction and a second, winding direction. Driving the film spool 16 in the first direction causes the photographic filmstrip 12 to be advanced from the film cartridge 10 through the film ingress/egress slot 24 and into a filmstrip transporting mechanism (not shown) associated with the printer/processor 68.

A conventional computer 84 controls the operation of the first reading means 72, the second reading means 74, the end of film sensor 76, the printing station 78, and the bi-directional spool drive apparatus 82.

Figure 5:
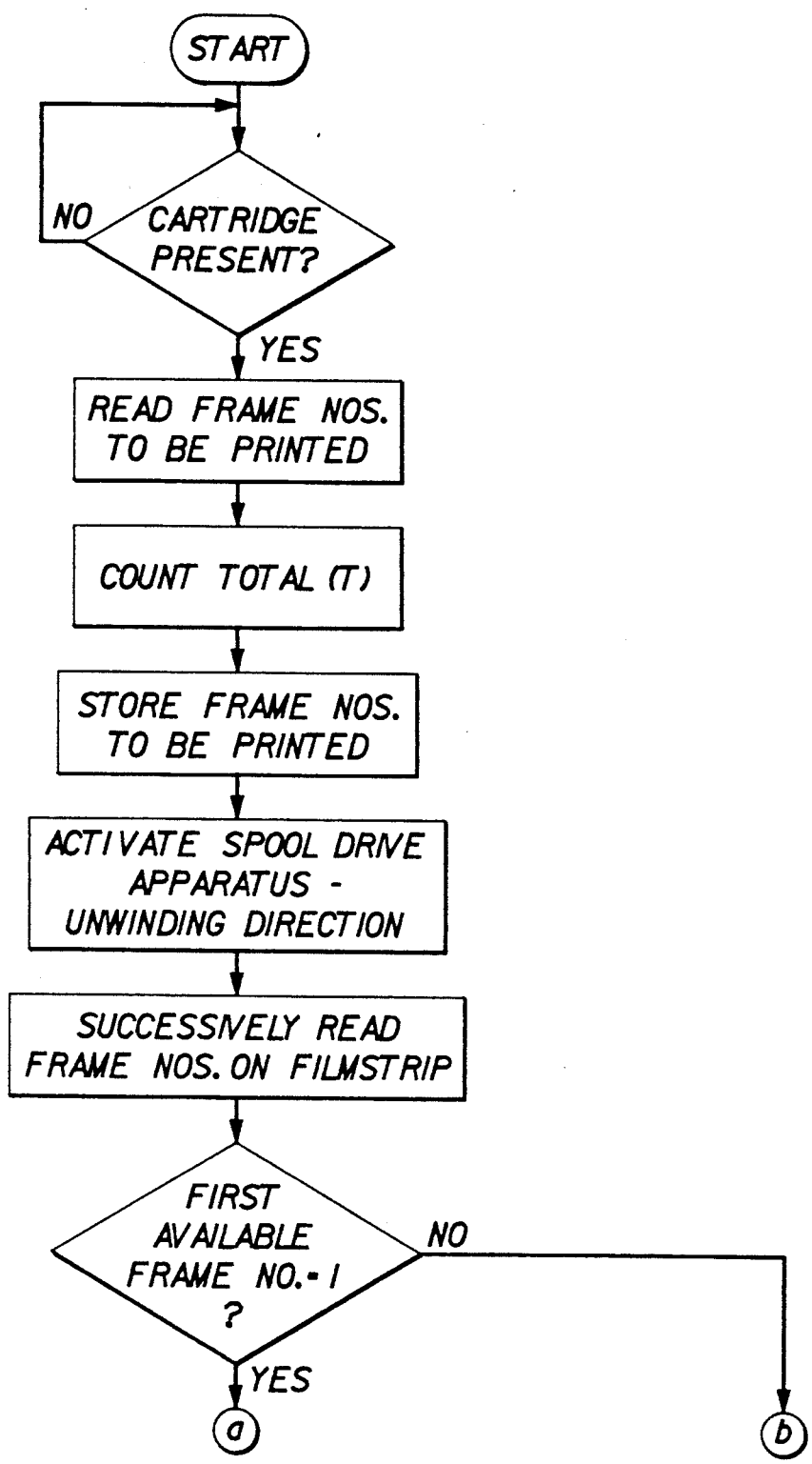
FIGS. 5 and 6 are flowcharts illustrating a method of reproducing images recorded on a photographic filmstrip embodying the present invention.
Figure 6:
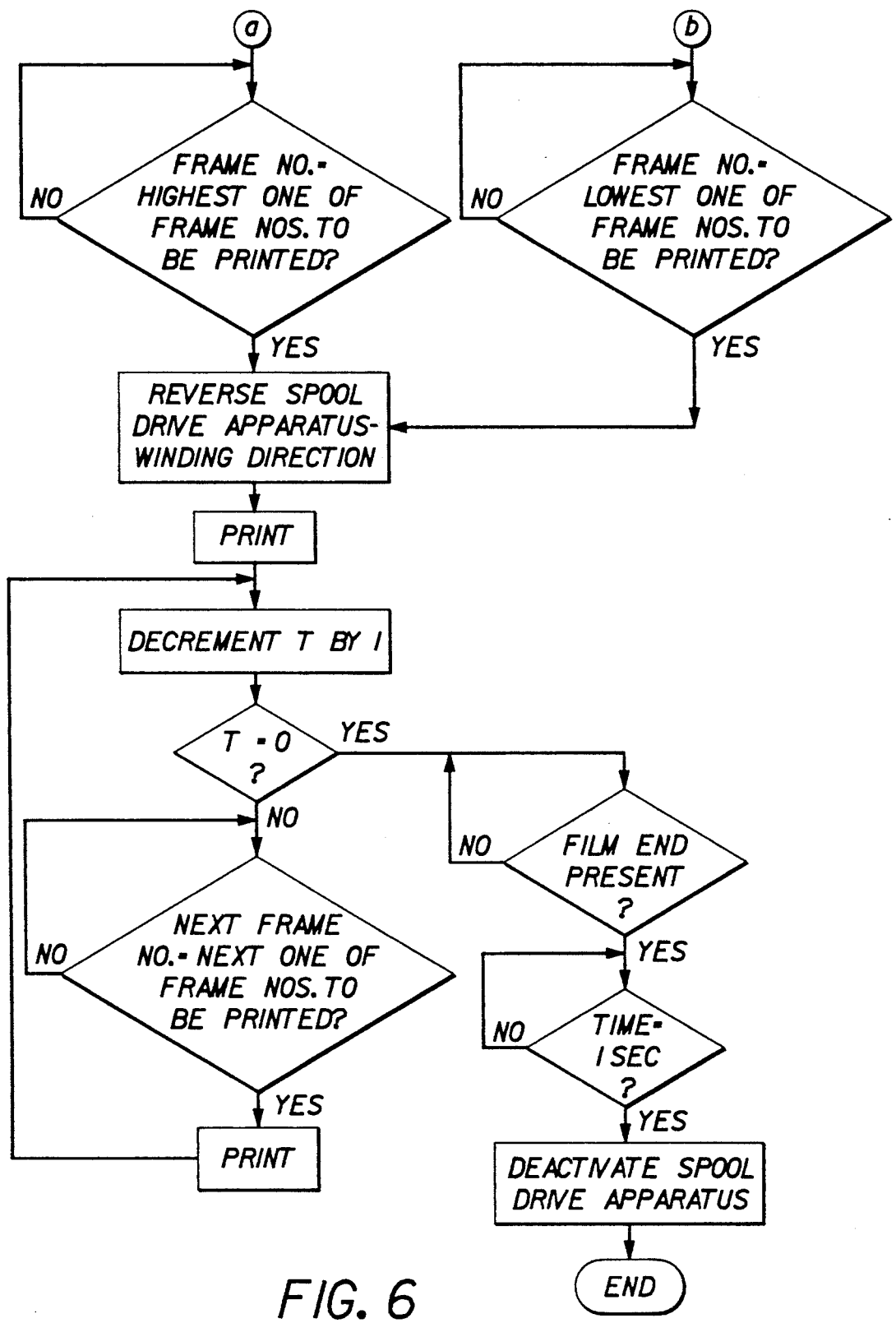

Referring to FIGS. 4 and the flowcharts illustrated in FIGS. 5 and 6, a method for reproducing selected images from a photographic filmstrip will now be described in conjunction with the operation of the printer/processor 68. The first reading means 72 is activated to read the film related data, including the frame numbers associated with selected images to be reproduced, from the data storing means 34 when the transporting apparatus 40, or the film cartridge, is placed in the nest means. For this description, it will be assumed that frame numbers four, seven and ten are to be reproduced. It will be obvious to one skilled in the art that any combination of images can be reproduced. The computer 84 then counts the number of images to be reproduced, sets that number equal to T, in this example T equals three, and stores the total T number of images to be reproduced.

The bi-directional spool drive apparatus 82 is then activated to drive the film spool 16 in the unwinding direction. The second reading means 74 is activated to successively read the frame numbers associated with images on the photographic filmstrip 12 and will determine the number of the first available frame 32.

If the first available frame number equals one, the bi-directional spool drive apparatus 82 continues to operate in the unwinding direction until the second reading means 74 detects the highest frame number to be reproduced, in this example the highest frame number to be reproduced is ten. The computer 84 will then direct the bi-directional spool drive apparatus 82 to reverse direction so that the film spool 16 is driven in the winding direction. Frame number ten is then transported to the printing station 78 where the image from the photographic filmstrip 12 is projected onto the photographic paper 69.

The computer 84 will decrement the total T by one after the image associated with frame number ten is printed, in this example the total T is now equal to two. The second reading means 74 continues to successively read the frame numbers on the photographic filmstrip 12 until it detects the frame number equal to the next lower frame number associated with an image to be reproduced, in this example the frame number equals seven. Frame number seven is transported to the printing station 78 where the image from the photographic filmstrip 12 is projected onto the photographic paper 69 and the computer 84 decrements the total T by one. The above process is repeated until the total T is equal to zero.

The end of film sensor 76 is activated by the computer 84 until the end of the photographic filmstrip 12 is detected by the sensor 76. The bi-directional spool drive apparatus 82 continues to operate for a predetermined amount of time, generally until substantially the entire photographic filmstrip 12 is wound into the cartridge 10. The photographic filmstrip 12 can be entirely wound into the film cartridge 10 or most of the photographic filmstrip can be wound into the film cartridge 10 leaving the leader portion exposed and clamped by the film clamping means (not shown). The computer 84 then deactivates the bi-directional spool drive apparatus 82.

If the first available frame number does not equal one, for example it equals thirty-six, the bi-directional spool drive apparatus 82 continues to operate until the second reading means 74 detects the lowest frame number to be reproduced, in this example the lowest frame number to be reproduced is four. The computer 84 will then direct the bi-directional spool drive apparatus 82 to reverse direction so that the film spool 16 is driven in the winding direction. Frame number four is then transported to the printing station 78 where the image from the photographic filmstrip 12 is projected onto the photographic paper 69.

The computer 84 will decrement the total T by one after the image associated with frame number four is printed, in this example the total T is now equal to two. The second reading means 74 continues to successively read the frame numbers on the photographic filmstrip 12 until it detects the frame number equal to the next higher frame number associated with an image to be reproduced, in this example the frame number equals seven. Frame number seven is transported to the printing station 78 where the image from the photographic filmstrip 12 is projected onto the photographic paper 69 and the computer 84 decrements the total T by one. The above process is repeated until the total T is equal to zero.

The end of film sensor 76 is activated by the computer 84 until the end of the photographic filmstrip 12 is detected by the sensor 76. The bi-directional spool drive apparatus 82 continues to operate for a predetermined amount of time, generally until substantially the entire photographic filmstrip is wound into the cartridge 10. The computer 84 then deactivates the bi-directional spool drive apparatus 82. The transporting apparatus 40 is now ready to be transferred to the next station in the photofinishing process.

It can be seen from the above description that only a portion of a photographic filmstrip will be removed from a film cartridge during a reprinting or make over printing process, thus preventing an end of the photographic filmstrip fixed to a film spool in the film cartridge from inadvertently slipping off the film spool and in many instances providing a relatively speedy process. Furthermore, a method and apparatus for reproducing selected images has been described which allows the printing of images onto photographic paper while one end of the photographic filmstrip remains fixed to the film spool in the cartridge.

While the invention has been described with particular reference to a preferred embodiment, it will be understood by those skilled in the art that various changes may be made and equivalents may be substituted for elements of the preferred embodiment without departing from invention.

I claim:

1. An apparatus for reproducing images recorded on a photographic filmstrip wound on a film spool contained in a cartridge, said photographic filmstrip having machine-readable frame numbers associated with said images recorded thereon and said photographic filmstrip being associated with means for storing film related data including frame numbers identifying selected images to be reproduced; said apparatus comprising first means for reading said stored data, second means for reading said frame numbers, means for printing said images onto a photographic paper and means for controlling said first and second reading means, and said printing means; said apparatus characterized in that:

said control means includes means for determining whether a frame number, read by said second reading means, of a first available frame on a photographic filmstrip removed from a film cartridge is equal to one or is greater than one; means for searching first for a highest of the respective frame reading means, on a photographic filmstrip removed from the cartridge and then in succession the next lowest frame number of the selected images until all of the frame numbers of the selected images have been found if the frame number of the first available frame of a photographic filmstrip is equal to one, or for searching first for a lowest of the respective frame reading means, on a photographic film strip removed from the cartridge and then in succession the next highest frame number of the selected images until all of the frame numbers of the selected images have been found if the frame number of the first available frame of a photographic filmstrip is greater than one, and means for activating said printing means to print each one of the selected images in response to its frame number being found.

2. An apparatus as defined in claim 1, wherein said frame numbers identifying selected images are stored optically on said storing means and said first reading means includes an optical reader adapted to read said optically stored frame numbers.

3. An apparatus as defined in claim 1, wherein said frame numbers identifying selected images are magnetically recorded on said storing means and said first reading means includes a magnetic reading element adapted to read said magnetically stored frame numbers.

4. An apparatus as defined in claim 1, wherein said frame numbers associated with images recorded on a photographic filmstrip are recorded optically on a photographic filmstrip and said second reading means includes an optical reader adapted to read said optically recorded frame numbers.

5. An apparatus as defined in claim 1, wherein said frame numbers associated with images recorded on a photographic filmstrip are magnetically recorded on a photographic filmstrip and said second reading means includes a magnetic reading element adapted to read said magnetically recorded frame numbers.

6. An apparatus as defined in claim 1, wherein said controlling means further includes means for counting said frame numbers identifying selected images to be reproduced read by said first reading means and storing a total number of said frame numbers identifying selected images to be reproduced and for decreasing said total number of frame numbers by one each time an image is printed by said printing means.

7. An apparatus as defined in claim 6, wherein said apparatus further includes means for driving said film spool in a first direction until said highest of the respective frame numbers of the selected images is found and for driving said film spool in a second opposite direction to transport said selected image to said printing means and then in succession transport the selected image identified by the next lowest frame number to the printing means until all of the selected images have been transported to the printing means if the first available frame of a photographic filmstrip is equal to one, or for driving said film spool in a first direction until said lowest of the respective frame numbers of the selected images is found and for driving said film spool in a second opposite direction to transport said selected image to said printing means and then in succession transport the selected image identified by the next highest frame number to the printing means until all of the selected images have been transported to the printing means if the first available frame of a photographic filmstrip is greater than one, and for driving said film spool until the photographic filmstrip is wound into the film cartridge when said total number of said frame numbers to be reproduced is equal to zero.

8. A method for reproducing selected images recorded on a photographic filmstrip contained in a film cartridge, said photographic filmstrip being associated with means for storing film related data including frame numbers identifying selected images to be reproduced; comprising the steps of reading the frame numbers identifying the selected images to be reproduced; and transporting the photographic filmstrip in a first direction towards a printing station; characterized by:

determining whether the frame number of a first available frame of a photographic filmstrip is equal to one or is greater than one;

if the frame number is determined to be equal to one, searching first for a highest of the respective frame numbers of the selected images on a photographic filmstrip removed from a film cartridge and then in succession the next lowest frame number of the selected images until all of the frame numbers of the selected images have been found;

if the frame number is determined to be greater than one, searching for a lowest of the respective frame numbers of the selected images on a photographic filmstrip removed from a film cartridge and then in succession the next highest frame number of the selected images until all of the frame numbers of the selected images have been found; and printing each one of the selected images in response to its frame number being found.

9. A method for reproducing selected images recorded on a photographic filmstrip as defined in claim 8, further including the steps;

counting and storing the total number of frame numbers identifying selected images to be reproduced; and decreasing the total number of frame numbers to be reproduced by one each time an image is reproduced at the printing station.

* * * * *

UNITED STATES PATENT AND TRADEMARK OFFICE
CERTIFICATE OF CORRECTION

PATENT NO.   : 5,317,364
DATED        : May 31, 1994
INVENTOR(S)  : Roger A. Fields It is certified that error appears in the above-identified patent and that said Letters Patent is hereby corrected as shown below:

Column 8, line 36, before the word "reading" insert --numbers of the selected images, read by said first--. Column 8, line 43, after "frame" insert --numbers of the selected images, read by said first--.

Signed and Sealed this

Thirtieth Day of August, 1994

Attest:

BRUCE LEHMAN

Attesting Officer       Commissioner of Patents and Trademarks